(12) United States Patent
Park et al.

(10) Patent No.: US 9,484,593 B2
(45) Date of Patent: Nov. 1, 2016

(54) STACK-FOLDING TYPE ELECTRODE ASSEMBLY

(71) Applicant: LG CHEM, LTD., Seoul (KR)

(72) Inventors: Ji-Hye Park, Daejeon (KR); Jae-Hyun Lee, Daejeon (KR); Su-Rim Lee, Daejeon (KR); Song-Taek Oh, Daejeon (KR); Jung-Seok Choi, Daejeon (KR); Hyeok-Moo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/762,409

(22) PCT Filed: Oct. 31, 2014

(86) PCT No.: PCT/KR2014/010399
§ 371 (c)(1),
(2) Date: Jul. 21, 2015

(87) PCT Pub. No.: WO2015/065127
PCT Pub. Date: May 7, 2015

(65) Prior Publication Data
US 2015/0357671 A1    Dec. 10, 2015

(30) Foreign Application Priority Data
Oct. 31, 2013 (KR) .......................... 10-2013-0131584

(51) Int. Cl.
*H01M 2/02* (2006.01)
*H01M 2/16* (2006.01)
(Continued)

(52) U.S. Cl.
CPC ......... *H01M 10/0436* (2013.01); *H01M 2/168* (2013.01); *H01M 2/1653* (2013.01);
(Continued)

(58) Field of Classification Search
CPC ......... H01M 10/0436; H01M 2/1653; H01M 2/1673; H01M 2/168; H01M 2/1686; H01M 10/0583
See application file for complete search history.

(56) References Cited

U.S. PATENT DOCUMENTS 8,765,307 B2 * 7/2014 Komiya .............. H01M 2/1673
429/163
2002/0160257 A1    10/2002 Lee et al.
(Continued)

FOREIGN PATENT DOCUMENTS

KR    2001-0082058 A    8/2001
KR    2001-0082059 A    8/2001
(Continued)

OTHER PUBLICATIONS

International Search Report, issued in PCT/KR2014/010399, mailed Mar. 11, 2015.
(Continued)

*Primary Examiner* — Stewart Fraser
(74) *Attorney, Agent, or Firm* — Birch, Stewart, Kolasch & Birch, LLP (57) ABSTRACT

The present disclosure provides a stack-folding type electrode assembly in which a plurality of full cells or bicells as unit cells is stacked on top of each other and surrounded by a second separator, each cell including a positive electrode, a negative electrode, and a first separator interposed between the positive electrode and the negative electrode, wherein a first binder is coated on at least a partial surface of the first separator, a second binder is coated on at least a partial surface of the second separator, and a content of the second binder is higher than a content of the first binder, to inhibit a loose phenomenon inside a battery, make the battery less prone to expansion, and have deformation resistance to an external impact.

7 Claims, 5 Drawing Sheets (51) Int. Cl.
*H01M 10/04* (2006.01)
*H01M 4/62* (2006.01)
*H01M 10/0525* (2010.01)
*H01M 10/0583* (2010.01)
*H01M 4/13* (2010.01)
*H01M 10/052* (2010.01)

(52) U.S. Cl.
CPC ......... *H01M 2/1673* (2013.01); *H01M 2/1686* (2013.01); *H01M 4/13* (2013.01); *H01M 4/622* (2013.01); *H01M 4/623* (2013.01); *H01M 10/0459* (2013.01); *H01M 10/052* (2013.01); *H01M 10/0525* (2013.01); *H01M 10/0583* (2013.01); *H01M 2/166* (2013.01); *H01M 2220/30* (2013.01); *Y02E 60/122* (2013.01)

(56) References Cited

U.S. PATENT DOCUMENTS

| | | |
|---|---|---|
| 2002/0160258 A1 | 10/2002 | Lee et al. |
| 2003/0013012 A1 | 1/2003 | Ahn et al. |
| 2005/0266292 A1* | 12/2005 | Kim ................. H01M 2/1646 429/141 |
| 2010/0261047 A1 | 10/2010 | Kim et al. |
| 2012/0196167 A1 | 8/2012 | Kim et al. |
| 2013/0004817 A1* | 1/2013 | Lee ................. H01M 2/145 429/94 |
| 2013/0011715 A1* | 1/2013 | Lee ................. H01M 4/621 429/144 |
| 2016/0028065 A1* | 1/2016 | Park ................. H01M 2/14 429/144 |

FOREIGN PATENT DOCUMENTS

| | | |
|---|---|---|
| KR | 2001-0082060 A | 8/2001 |
| KR | 10-2008-0095770 A | 10/2008 |
| KR | 10-2011-0037781 A | 4/2011 |
| KR | 10-2011-0058657 A | 6/2011 |
| KR | 10-2013-0006256 A | 1/2013 |
| KR | 10-1278739 B1 | 6/2013 |

OTHER PUBLICATIONS

Written Opinion of the International Searching Authority, issued in PCT/KR2014/010399, mailed Mar. 11, 2015.

* cited by examiner

STACK-FOLDING TYPE ELECTRODE ASSEMBLY

TECHNICAL FIELD

The present disclosure relates to a stack-folding type electrode assembly. More particularly, the present disclosure relates to a stack-folding type electrode assembly with improved battery performance of an electrochemical device.

The present application claims priority to Korean Patent Application No. 10-2013-0131584 filed in the Republic of Korea on Oct. 31, 2013, the disclosures of which are incorporated herein by reference.

BACKGROUND ART

Recently, there has been growing interest in energy storage technologies. As the application fields of energy storage technologies have been extended to mobile phones, camcorders, lap-top computers and even electric cars, efforts have been increasingly made towards the research and development of batteries. In this aspect, electrochemical devices have attracted the most attention, and particularly, with the recent movement toward minimization and light weight of electronic devices, the development of secondary batteries having a small size and light weight and capable of charging and discharging with high capacity is the focus of particular interest.

A secondary battery is classified, based on a structure of an electrode assembly composed of a positive electrode/a separator/a negative electrode, typically into a jelly-roll (wound) electrode assembly having a structure in which long sheet-type positive and negative electrodes are wound with separators interposed between, and a stack-type electrode assembly having a structure in which a plurality of positive and negative electrodes cut to a predetermined size are stacked in a sequential order with separators interposed between.

However, these traditional electrode assemblies have several problems.

First, a jelly-roll electrode assembly is made by winding long sheet-type positive and negative electrodes with a high density into a cylindrical or oval structure in cross section, and during charge and discharge, stresses caused by expansion and contraction of the electrode accumulate in the electrode assembly, and when the accumulated stresses exceed a predetermined limit, deformation of the electrode assembly occurs. The deformation of the electrode assembly results in non-uniform interval between the electrodes, so the battery performance drastically degrades, and if an internal short circuit occurs, the battery safety may be threatened. Also, when winding long sheet-type positive and negative electrodes, it is difficult to wind the positive and negative electrodes at a high speed with regular intervals therebetween, resulting in reduced productivity.

Second, a stack-type electrode assembly is made by stacking a plurality of positive and negative electrode units in a sequential order, and thus, a delivery process of a polar plate for manufacturing the unit is separately needed and a sequential stacking process takes a lot of time and effort, resulting in low productivity.

To solve the problems, attempts have been made to develop an electrode assembly of an advanced structure in which a jellyroll type and a stack type are combined, called a stack-folding type electrode assembly having a structure in which bicells or full cells including a predetermined unit of positive and negative electrodes stacked with separators interposed between are folded using a long continuous separator sheet, and examples are disclosed in the Applicant's Patent Application Publication Nos. 2001-0082058, 2001-0082059, and 2001-0082060.

Figure 1:
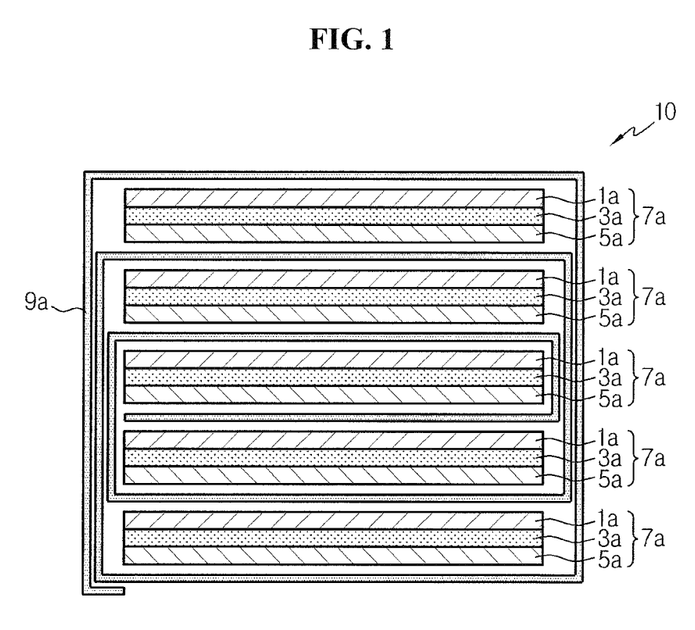
FIG. 1 is a schematic cross-sectional view illustrating an example of implementation of a stack-folding type electrode assembly.
Figure 2:
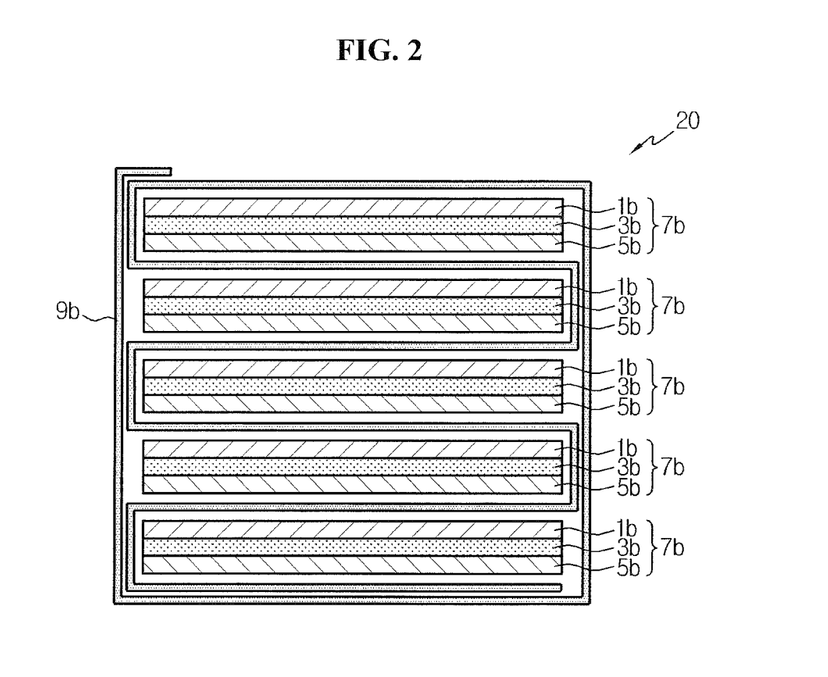
FIG. 2 is a schematic cross-sectional view illustrating another example of implementation of a stack-folding type electrode assembly.
Figure 3:
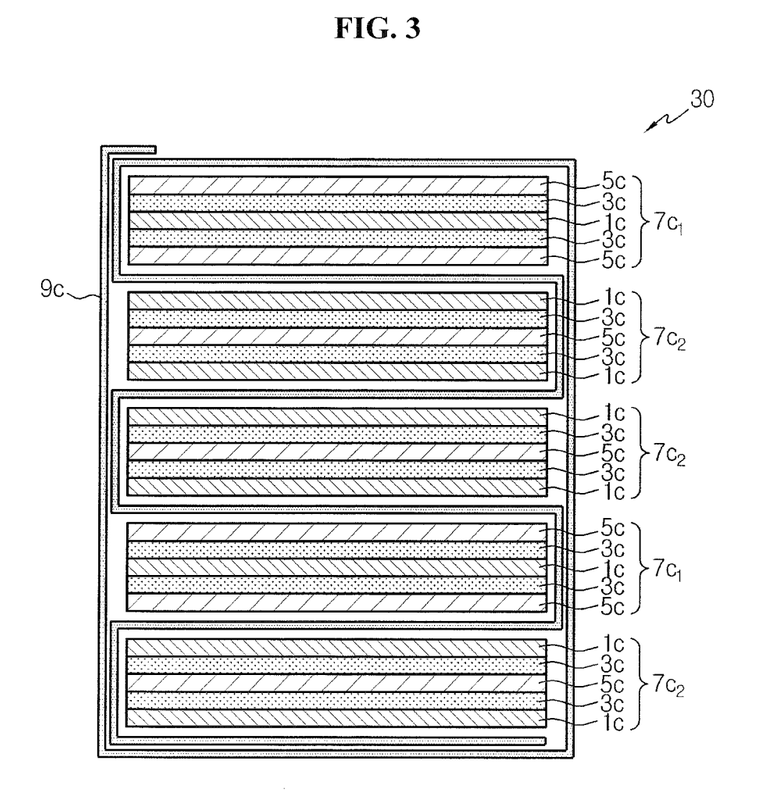
FIG. 3 is a schematic cross-sectional view illustrating still another example of implementation of a stack-folding type electrode assembly.

FIGS. 1 through 3 are schematic cross-sectional view illustrating a structure of a stack-folding type electrode assembly. In the drawings, like reference numerals designate like elements.

Referring to FIGS. 1 through 3, electrode assemblies 10, 20, and 30 include a plurality of unit cells 7a, 7b, and 7$c_1$ and 7$c_2$, each unit cell including first separators 3a, 3b, and 3c, and negative electrodes 1a, 1b, and 1c and positive electrodes 5a, 5b, and 5c disposed at both sides of the first separators 3a, 3b, and 3c, respectively. The positive electrodes 5a, 5b, and 5c have a structure in which a positive electrode active material layer is formed on both surfaces of a positive electrode current collector, and the negative electrodes 1a, 1b, and 1c have a structure in which a negative electrode active material layer is formed on both surfaces of a negative electrode current collector. As shown in FIGS. 1 through 3, the unit cell may be formed in various structures including a structure of full cells 7a and 7b in which the positive electrodes 5a and 5b and the negative electrodes 1a and 1b are disposed one by one at both sides of the first separator 3a and 3b, and a structure of bicells 7$c_1$ and 7$c_2$ in which the first separator 3c is disposed on both surfaces of the positive electrode 5c or the negative electrode 1c and the negative electrode 1c or the positive electrode 5c is disposed on each of the first separators 3c (a structure of positive electrode/separator/negative electrode/separator/positive electrode or a structure of negative electrode/separator/positive electrode/separator/negative electrode).

Inside the electrode assemblies 10, 20, and 30, each of the unit cells 7a, 7b, 7$c_1$, and 7$c_2$ exists in a stacked shape. In this instance, continuous single second separators 9a, 9b, and 9c are arranged in various shapes as shown in FIGS. 1 through 3 between the adjacent unit cells 7a, 7b, and 7$c_1$ and 7$c_2$ corresponding to each other, surrounding the unit cells 7a, 7b, and 7$c_1$ and 7$c_2$, respectively, and serve as a separator between the unit cells 7a, 7b, and 7$c_1$ and 7$c_2$, respectively.

The manufactured stack-folding type electrode assembly is received in a battery case, followed by injection of an electrolyte solution, to fabricate a battery. In this instance, during operation of the battery, gas produced due to decomposition of the electrolyte solution and a side reaction of the battery induces a loose phenomenon inside the battery, causing the battery performance deterioration. That is, inevitably the battery is swollen and thereby the battery performance degrades, and in the event of an external impact, the battery is vulnerable to deformation and the strength of the battery may reduce. Particularly, the likelihood that these problems will occur increases when used at high temperature.

DISCLOSURE

Technical Problem

The present disclosure is to providing a stack-folding type electrode assembly which inhibits a loose phenomenon inside a battery, is less prone to battery expansion, and has deformation resistance to an external impact.

Technical Solution

To achieve the above object, according to one aspect of the present disclosure, there is provided a stack-folding type electrode assembly including a stack of a plurality of full cells or bicells as unit cells surrounded by a second separator, each unit including a positive electrode, a negative electrode, and a first separator interposed between the positive electrode and the negative electrode, wherein a first binder is coated on at least a partial surface of the first separator, a second binder is coated on at least a partial surface of the second separator, and a content of the second binder is higher than a content of the first binder.

According to an exemplary embodiment of the present disclosure, the content of the second binder may be higher by 2% to 10% than the content of the first binder.

According to another exemplary embodiment of the present disclosure, the first binder and the second binder may be, independently, at least one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, celluloseacetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide.

According to another exemplary embodiment of the present disclosure, each of the first separator and the second separator may be independently configured to include a) a porous substrate having pores, or b) a porous substrate having pores and an organic-inorganic porous coating layer formed from a mixture of inorganic particles and a binder polymer on at least one surface of the porous substrate.

According to another exemplary embodiment of the present disclosure, the porous substrate may be formed from at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, and polyethylenenaphthalene.

According to another aspect of the present disclosure, there is provided an electrochemical device including a stack-folding type electrode assembly according to the present disclosure received in a case.

According to an exemplary embodiment of the present disclosure, the electrochemical device may be a lithium secondary battery.

Advantageous Effects

A stack-folding type electrode assembly of the present disclosure has a higher binder content in a second separator surrounding unit cells than a binder content in a first separator, thereby further improving the adhesive strength of the separator surrounding the unit cells. Through this, deterioration in battery performance may be prevented by keeping a loose phenomenon inside the battery from occurring due to gas produced by a side reaction during operation of the battery. Also, due to a loose phenomenon inside the battery, a risk of being vulnerable to deformation when an external impact is applied may be reduced.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

| <Description of reference numerals> | |
|---|---|
| 10, 20, 30: electrode assembly | 3a, 3b, 3c: first separator |
| 1a, 1b, 1c: negative electrode | 5a, 5b, 5c: positive electrode |
| 7a, 7b, 7c$_1$, 7c$_2$: unit cell | 9a, 9b, 9c: second separator |
| 101, 201: positive electrode | 103, 203: first separator |
| 105, 205: negative electrode | 109: second separator |
| 110, 120, 130, 140, 150: full cell | 210, 220, 230, 240, 250: bicell |

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The present disclosure relates to a stack-folding type electrode assembly in which a plurality of full cells or bicells as unit cells is stacked on top of each other and surrounded by a second separator, each unit cell including a positive electrode, a negative electrode, and a separator interposed between the positive electrode and the negative electrode, wherein a first binder is coated on at least a partial surface of the first separator, a second binder is coated on at least a partial surface of the second separator, and a content of the second binder is higher than that of the first binder.

In the present disclosure, the first separator is interposed between the positive electrode and the negative electrode within the unit cell, and as opposed to the first separator, the second separator acts to surround the unit cells. In this instance, the first separator is laminated with the electrode and thus has a high adhesive strength, while the second separator does not undergo separate lamination and thus has a lower adhesive strength. That is, when the second separator has the same ingredients and composition as the first separator, the second separator surrounding the unit cells has a reduction in adhesive strength.

While a battery including a stack-folding type electrode assembly works, gas may be produced due to decomposition of an electrolyte solution and a side reaction of the battery, causing a loose phenomenon in which a poorly adhered part gets loose inside the battery, resulting in performance deterioration of the battery.

To solve the problem, the inventors attempted to increase the surface adhesive strength of the second separator surrounding the unit cells, more particularly, higher than that of the first separator when the first separator is used to surround the unit cells, to minimize a loose phenomenon inside the battery, and completed the present invention.

According to an exemplary embodiment of the present disclosure, the content of the second binder is higher by 2% to 10%, preferably 3% to 5% than the content of the first binder. Through an increase in the content of the binder coated on the surface of the separator within the above range, the surface adhesive strength of the second separator may be improved to effectively control a loose phenomenon inside the battery and an increase in resistance caused by the addition of the binder may be minimized.

Due to this binder content difference, the surface adhesive strength of the second separator surrounding the unit cells may be further improved, more particularly, higher than that of the first separator when the first separator is used to surround the unit cells. Preferably, the surface adhesive strength of the second separator may be from 3 gf/cm to 10 gf/cm, and the surface adhesive strength of the first separator when the first separator is used to surround the unit cells may be from 1 gf/cm to 2 gf/cm. This surface adhesive strength is measured through a peel test method.

The first binder and the second binder may be, independently, at least one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, celluloseacetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, and the first binder and the second binder may be identical or different.

The first separator and the second separator according to the present disclosure may include the first binder and the second binder by the following method, and is not limited thereto.

According to an exemplary embodiment of the present disclosure, first, a binder resin such as polyvinylidene fluoride-co-trichloroethylene is put in a solvent such as acetone, dimethylacetamide (DMA) or N-methyl-2-pyrrolidone (NMP), or a mixed solvent thereof, to prepare a solution, which is coated on the surface of the first separator and the second separator. Here, the coating is performed by a dip coating, die coating or roll coating method.

As another method, a film may be made from a polymer binder resin such as polyvinylidene fluoride-co-trichloroethylene, and heat laminated onto the surface of the first separator and the second separator.

As a particular example, after a solution including polyvinylidene fluoride-co-trichloroethylene and the above-described solvent is prepared, the solution is coated and dried on a support film or a release paper of polyesters such as Mylar to produce a film, and then this film is formed on the surface of the first separator and the second separator by a heat lamination process.

As another example, a method without using a solvent, a binder resin such as polyvinylidene fluoride-co-trichloroethylene is directly fed into an extruder, and is extrusion-molded through a film die to produce a film, and the resulting film is formed on a polymer separator or separation film by a heat lamination process. In this instance, the lamination with the first separator and the second separator may be performed while making the binder film using an extruder.

In the present disclosure, each of the first separator and the second separator may be independently configured to include a) a porous substrate having pores, or b) a porous substrate having pores and an organic-inorganic porous coating layer formed from a mixture of inorganic particles and a binder polymer on at least one surface of the porous substrate.

When the first separator and the second separator have organic-inorganic porous coating layers, the binder polymer included in the organic-inorganic porous coating layer of the second separator is higher in content than the binder polymer included in the organic-inorganic porous coating layer of the first separator, implying that the surface adhesive strength of the second separator is higher than the surface adhesive strength of the first separator.

The porous substrate may be formed from at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, and polyethylenenaphthalene, and the polyolefin may be any one polymer selected from the group consisting of polyethylene, polypropylene, polybutylene, and polypentene.

Based on necessary functions, the separator may be formed in a layer structure composed of polymers such as polypropylene/polyethylene/polypropylene.

The organic-inorganic porous coating layer has the inorganic particles adhered to each other by the binder polymer to maintain a bound state of the inorganic particles (that is, the binder polymer connects and holds the inorganic particles), and the organic-inorganic porous coating layer maintains a bound state with the porous substrate by the binder polymer. The inorganic particles of the organic-inorganic porous coating layer are present substantially in contact with each other in a closed packed or densely packed structure, and interstitial volumes formed by the contact of the inorganic particles become pores of the organic-inorganic porous coating layer. The separator with the organic-inorganic porous coating layer has good heat resistance and enhanced stability, but may have an increased electrical resistance due to the binder polymer.

The inorganic particles are not particularly limited if they are only electrochemically stable. That is, the inorganic particles used in the present disclosure are not particularly limited if they do not cause oxidation and/or reduction reactions in an operating voltage range (for example, from 0 to 5V for $Li/Li^+$) of an electrochemical device to be applied. In particular, when inorganic particles capable of transporting ions are used, such inorganic particles may increase ion conductivity in an electrochemical device, contributing to the improved performance. Also, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution. For these reasons, the inorganic particles preferably include inorganic particles having a high dielectric constant greater than or equal to 5, preferably, greater than or equal to 10, inorganic particles capable of transporting lithium ions, or mixtures thereof.

Preferably, a thickness of the first separator may be from 12 μm to 16 μm, and a thickness of the second separator may be from 13 μm to 17 μm.

Hereinafter, the structure of the stack-folding type electrode assembly of the present disclosure is described in more detail.

A general full cell has a structure in which a layered structure of a positive electrode, a negative electrode, and a first separator is cut to regular shape and size and stacked. Here, for all the electrodes, an electrode having a coating of an electrode active material around a current collector is used. This structure is treated as one unit cell for constructing a battery by stacking, and to do so, the electrode and the first separator need to be adhered with a film.

The full cell having the above structure represents a stacked structure in which two outermost electrodes comprise a positive electrode and a negative electrode such as positive electrode/separator/negative electrode or positive electrode/separator/negative electrode/separator/positive electrode/separator/negative electrode. In contrast, the bicell represents a stacked structure in which two outermost electrodes comprise the same electrode, and is classified into a negative electrode-type bicell composed of positive electrode/separator/negative electrode/separator/positive electrode and a positive electrode-type bicell composed of negative electrode/separator/positive electrode/separator/negative electrode.

The electrode according to the present disclosure is not limited to a particular type, and may be made by coating an electrode active material slurry on a current collector according to a common method known in the art. A positive electrode active material and a negative electrode active material used in the electrodes may include a common electrode active material used in a positive electrode and a negative electrode of a traditional electrochemical device. Of the electrode active material, the positive electrode active material preferably includes, as a non-limiting example, lithium manganese oxide, lithium cobalt oxide, lithium nickel oxide, lithium iron oxide, or lithium composite oxides thereof. The negative electrode active material preferably includes, as a non-limiting example, lithium metals or lithium alloys, soft carbon, hard carbon, natural graphite, Kish graphite, pyrolytic carbon, mesophase pitch based carbon fibers, meso-carbon microbeads, Mesophase pitches, and petroleum or coal tar pitch derived cokes.

After the electrode active material is added to an organic solvent together with an additive such as a binder and a conductive material by a common method in the art to prepare an electrode mix slurry, the slurry may be coated on each electrode current collector, to make an electrode. A non-limiting example of a positive electrode current collector may include aluminum and nickel, and a non-limiting example of a negative electrode current collector may include copper, gold, nickel or copper alloys.

When the unit cells are prepared as above, an electrode assembly may be manufactured using a stack-folding method as shown in FIGS. 1 through 3. Specifically, folding is performed in a direction in which the second separator surrounds the unit cells or bicells, to have an arrangement structure in which the unit cells or bicells correspond to each other in a stacked shape.

Figure 4:
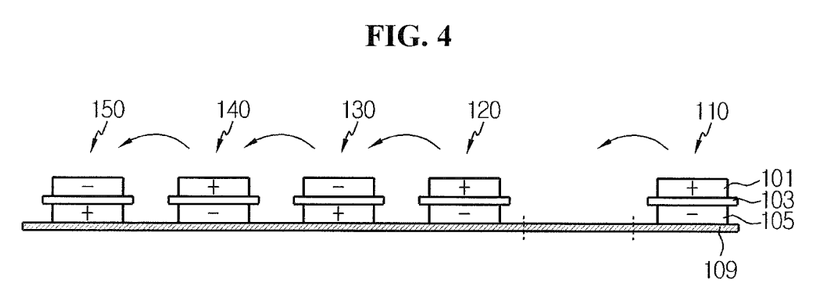
FIG. 4 is a schematic cross-sectional view illustrating a stack-folding type electrode assembly including unit cells according to an exemplary embodiment of the present disclosure.
Figure 5:
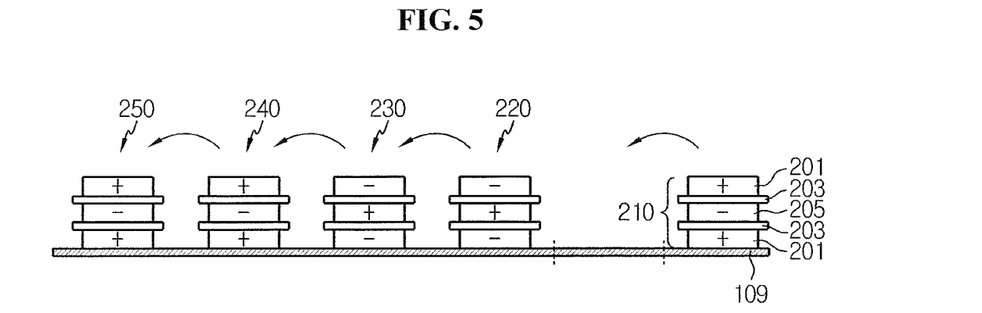
FIG. 5 is a schematic cross-sectional view illustrating a stack-folding type electrode assembly including bicells according to another exemplary embodiment of the present disclosure.

In FIGS. 4 and 5, a fold direction for manufacturing the electrode assembly shown in FIG. 1 is indicated by an arrow, and a fold line is indicated as a dotted line. In this instance, FIG. 4 shows the use of full cells, and FIG. 5 shows the use of bicells.

As shown in the drawings, when folding starts from a right end, there is an area approximately corresponding to a width of one unit cell 110 or bicell 210 in which no unit cell or bicell is placed, to cause electrodes 101 and 201 disposed on top of the unit cell 110 or bicell 210 to come into contact with separators 109 and 209.

Subsequently, when a folding process is continuously performed in an arrow direction from a point indicated as a dotted line, all unit cells 110, 120, 130, 140, and 150 or bicells 210, 220, 230, 240, and 250 are surrounded by the second separators 109 and 209 with the second separators 109 and 209 interposed between adjacent unit cells or bicells, and have an arrangement structure in which the unit cells or bicells correspond to each other in a stacked shape (stack-folding). In this instance, to perform the stack-folding process as above, intervals between the unit cells 120, 130, 140, and 150 and between the bicells 220, 230, 240, and 250 subsequent to the initial unit cell 110 and bicell 210 shown in FIGS. 4 and 5 correspond to heights of the cells stacked before each unit cell or bicell, and it is obvious that the intervals gradually increase, but in FIGS. 4 and 5, those skilled in the art should understand that the interval is illustrated as being uniform for convenience of representation.

In the electrolyte solution used in the present disclosure, a lithium salt included as an electrolyte is not limited to a particular type if it is commonly used in an electrolyte solution for a lithium secondary battery, and an anion of the lithium salt may be, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte solution used in the present disclosure, an organic solution included in the electrolyte solution is not limited to a particular type if it is commonly used in an electrolyte solution for a lithium secondary battery, and may typically include any one selected from the group consisting of propylene carbonate (PC), ethylene carbonate (EC), diethyl carbonate (DEC), dimethyl carbonate (DMC), ethyl methyl carbonate (EMC), methyl propylene carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or mixtures thereof. Particularly, among the exemplary carbonate-based organic solvents, it is desirable to use cyclic carbonate such as ethylene carbonate and propylene carbonate which corresponds to an organic solvent with high viscosity and allows favorable dissolution of the lithium salt in the electrolyte by virtue of a high dielectric constant, and when cyclic carbonate is mixed with linear carbonate with a low viscosity and a low dielectric constant such as dimethyl carbonate and diethyl carbonate at an optimum ratio, the use of such a mixture contributes to preparation of an electrolyte solution with higher electrical conductivity.

Optionally, the electrolyte solution stored according to the present disclosure may further include an additive such as an overcharge protection agent being commonly included in an electrolyte solution.

A battery case being commonly used in the art may be employed in the present disclosure, and there is no limitation on an external shape based on the purpose of the battery, and for example, a cylindrical shape using a can, a prismatic shape, a pouch-shape, or a coin-shape may be contemplated.

When the electrode assembly is completed, the electrode assembly may be received in the case by a common method, followed by sealing, to fabricate an electrochemical device. The electrochemical device is preferably a lithium secondary battery.

What is claimed is:

1. A stack-folding type electrode assembly comprising a stack of a plurality of full cells or bicells as unit cells surrounded by a second separator, each unit cell comprising a positive electrode, a negative electrode, and a first separator interposed between the positive electrode and the negative electrode, wherein a first binder is coated on at least a partial surface of the first separator, a second binder is coated on at least a partial surface of the second separator, and a content of the second binder is higher than a content of the first binder.

2. The stack-folding type electrode assembly according to claim 1, wherein the content of the second binder is higher by 2% to 10% than the content of the first binder.

3. The stack-folding type electrode assembly according to claim 1, wherein the first binder and the second binder are, independently, at least one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, celluloseacetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide.

4. The stack-folding type electrode assembly according to claim 1, wherein each of the first separator and the second separator are independently configured to include a) a porous substrate having pores, or b) a porous substrate having pores and an organic-inorganic porous coating layer formed from a mixture of inorganic particles and a binder polymer on at least one surface of the porous substrate.

5. The stack-folding type electrode assembly according to claim 4, wherein the porous substrate is formed from at least one selected from the group consisting of polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, and polyethylenenaphthalene.

6. An electrochemical device comprising a stack-folding type electrode assembly according to claim 1 received in a case.

7. The electrochemical device according to claim 6, wherein the electrochemical device is a lithium secondary battery.

* * * * *